Patented May 28, 1940

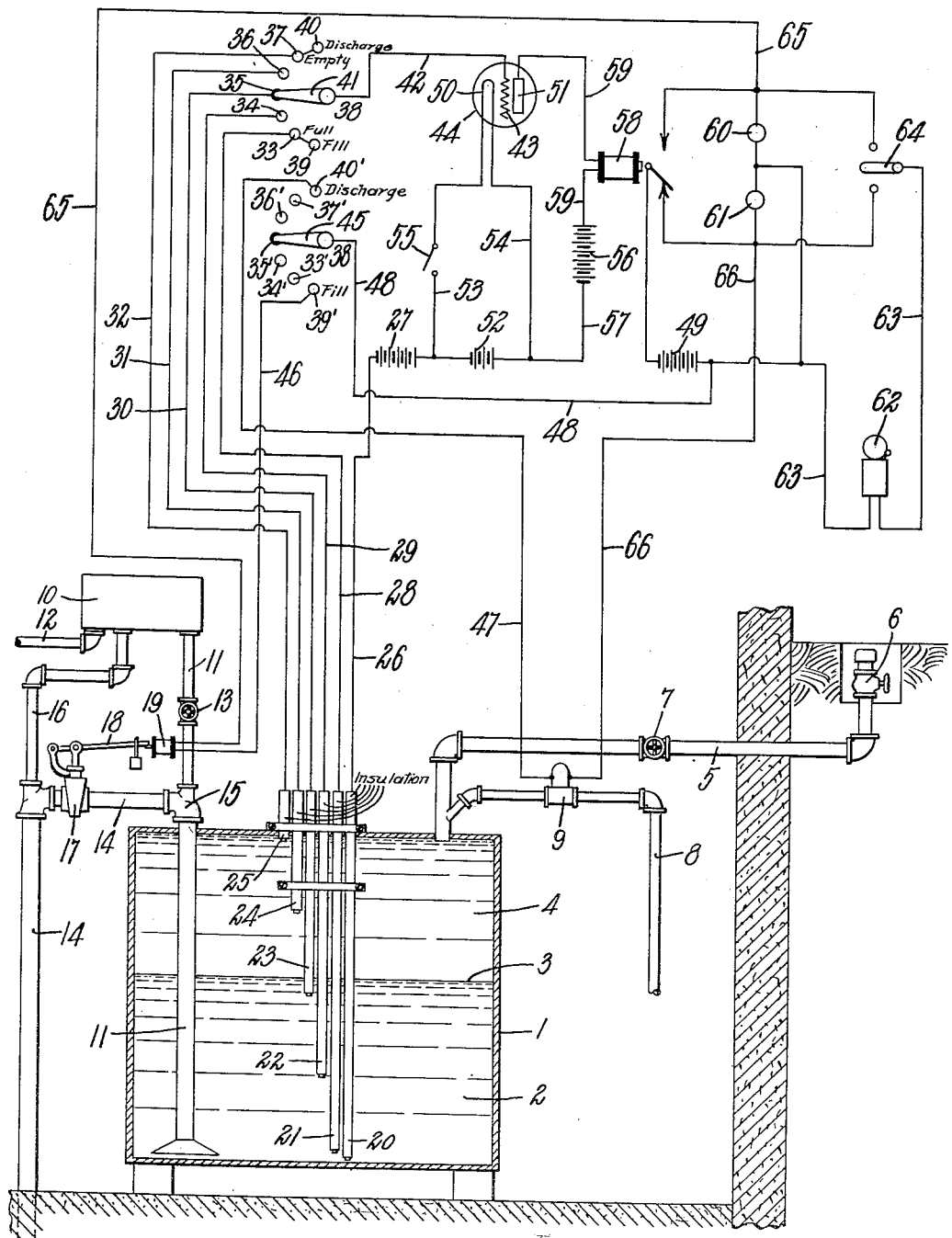

2,202,197

UNITED STATES PATENT OFFICE 2,202,197

GAUGE AND CONTROL APPARATUS FOR LIQUID CONTAINERS

Gordon E. Ewertz, Elizabeth, N. J.

Application December 3, 1935, Serial No. 52,735

2 Claims. (Cl. 177—311)

This invention relates broadly to a gauge and control apparatus for liquid containers.

The primary object of the invention is to provide a gauge and control apparatus for liquid containers, as, for example, hydraulic systems such as hard tank fuel systems, or other liquid containers wherein may be found a liquid supporting a gas, such as air or any other gas, or, a liquid supporting other non-mixing liquids, said gauge and control apparatus being combined one with another or not, as may be desired.

Another object of the invention is to provide a safe and effective apparatus for gauging one or more liquids within a container and, if desired, for controlling the flow of said liquids into and out of said container.

Another object of the invention is to provide an apparatus that may be locally and/or remotely operated and observed; that makes possible the accurate control of a hydraulic system without the necessity of introducing hydrostatic balance to prevent over-delivery or over-filling, and, furthermore, makes possible a direct pressure hydraulic system.

Still another object of the invention is to provide an apparatus which has no moving parts within the container, and which is independent of the Baumé of the liquid or liquids in the container.

An important consideration in the operation of the apparatus is the substantial elimination of electrolysis in an electrically actuated mechanism. It is, therefore, an object of this invention to utilize a vacuum tube, or tubes, in the structure of the apparatus in such a manner that hazards caused by electrolysis will be eliminated.

The invention consists in a gauge and control apparatus for liquid containers, said gauge and control apparatus being combined one with another or not, as set forth in the following specification and particularly as pointed out in the claims thereof.

The figure of the drawing is a diagrammatical illustration of a gauge and control apparatus embodying my invention and as applied to a hard tank fuel system, said gauge and control apparatus being adapted to be combined one with another or not, as may be desired.

In the drawing, 1 represents a closed container, preferably the fuel tank of a hard tank fuel system, and 2 represents water in said tank to a level indicated at 3 above which the tank is filled with fuel oil 4. The oil 4 is supplied to the tank 1 through a fuel supply pipe 5 in which are hand-operated valves 6 and 7. A feed pipe 8 delivers the oil within the tank 1 from the top thereof to a burner or burners well known in the art and utilizing oil as a fuel, said burners being located as may be desired. A solenoid valve 9 of well-known construction and actuated in a manner hereinafter to be described is provided for the pipe 8.

The water 2 is supplied to the tank 1 from a tank 10 of well-known type positioned at a suitable height above said tank 1 and connected thereto by a pipe 11 which discharges into the tank 1 at a point adjacent to the bottom thereof. The tank 10 receives its supply of water under pressure from a suitable reservoir for said water through a pipe 12, and delivers said water by gravity to the tank 1. A hand-operated valve 13 is provided for the pipe 11. A discharge pipe 14 for the water within the tank 1 is connected to the pipe 11 at 15 between said tank and the valve 13. An overflow pipe 16 for the tank 10 connects with the pipe 14. A weighted, lever-operated gate valve 17 of well-known construction is provided for the pipe 14, a lever 18 of said gate valve being released to permit the valve to close by means of a solenoid release catch 19 actuated in a manner hereinafter to be described.

That portion of the mechanism of the invention which constitutes the gauge and control mechanism therefor, and which may be located at a point adjacent to the tank 1, or at a point remotely removed therefrom, if it is so desired, is as follows:—Mounted within the tank 1 are a plurality of electrodes 20, 21, 22, 23, 24 and 25 all insulated from each other and from the tank 1. As illustrated, these electrodes consist of insulated rods of different lengths having bare lower extremities exposed to the liquids in the tank at different levels therein, but it is evident that said electrodes may be of any desired construction provided they have electric contact points embodied therein which are exposed to the liquids and are located at different elevations in the tank and are insulated therefrom, and they may consist of plugs mounted at different elevations in the side of the tank, if it is so desired, without departing from the spirit of the invention. The electrode 20 is common to all of the circuits which include the other electrodes, and the tank 1 itself may be used as a common lead in place of the electrode 20, if it is so desired.

The electrode 20 is connected by a wire 26 with the negative pole of a grid battery 27. The electrodes 21, 22, 23, 24 and 25 are connected by wires 28, 29, 30, 31 and 32 respectively with contact members 33, 34, 35, 36 and 37 respectively of a two bank rotary switch 38. Other contacts 39 and 40 of said switch 38 are electrically connected to the contacts 33 and 37 respectively. An arm 41 of the switch 38 is electrically connected by a wire 42 to the grid 43 of a vacuum tube 44. Another arm 45 of the rotary switch 38 upon the opposite side thereof from the arm 41 is movable in unison with said arm 41, but is insulated therefrom. The arm 45 of the switch 38 engages contact members 33', 34', 35', 36', 37', 39' and 40' oppositely disposed to the contacts 33, 34, 35, 36, 37, 39 and 40 respectively, but independent thereof and insulated therefrom. The contact 39' is connected by a wire 46 to the solenoid release catch 19 for the gate valve 17, and the contact 40' is connected by a wire 47 to the solenoid valve 9. The arm 45 is electrically connected by a wire 48 to a battery 49 which furnishes power for visible and audible signals hereinafter to be described.

The vacuum tube 44 is well known in the art and embodies therein a grid 43, a filament 50 and a plate 51. Current for the filament 50 is provided by a battery 52 which is connected thereto by wires 53 and 54. A switch 55 is provided in the wire 53 and the latter is also connected to the grid battery 27. Current for the plate 51 is provided by a battery 56, one side of which is connected by a wire 57 to the wire 54, and the other side is connected by a wire 59 to the plate 51 through a relay 58.

The relay 58 opens and closes local signal circuits, one of which includes a red light 60 and the battery 49, while another includes a green light 61 and the battery 49. An audible signal as, for example, a bell alarm 62 may be connected into both of these local circuits by wires 63 and a switch 64. The red and green lights are connected together and one side of the light 60 is connected by a wire 65 to the solenoid release catch 19, and one side of the light 61 is connected by a wire 66 to the solenoid valve 9. In the operation of the apparatus the lights 60 and 61 are located in separate circuits. The bell 62 and switch 64 are connected one to another, and to the battery 49, by the wire 63, and said battery furnishes the power for said bell and for the lights 60 and 61.

The general operation of the apparatus hereinbefore specifically described is as follows: Assuming first that the apparatus is functioning as a control device, and that fuel oil 4 in the tank 1 is being discharged to burners not illustrated in the drawings, but well-known in the art, the valves 6 and 7 in the fuel supply pipe 5 are closed and the solenoid valve 9 in the supply pipe 8 to the burners is open. At this time, also, the valve 17 is closed and the valve 13 is open, thereby permitting the oil in the tank to feed to the burners and also providing the necessary water to displace the fuel oil consumed.

Under these conditions, furthermore, the arms 41 and 45 of the switch 38 are at "discharge" position in engagement with the contacts 40 and 40' respectively of said switch. As the level of the water 2 in the tank 1 rises and the amount of oil 4 above said water decreases, the water will finally contact with the exposed lower extremity of the electrode 25, whereupon an electric circuit will be closed through said water between the electrodes 20 and 25. As the leads 26 and 32 of the electrodes 20 and 25 respectively are connected to a negative potential and the grid 43 of the vacuum tube 44, when said electrodes are in the water, the negative potential will be applied to the grid of said vacuum tube and the plate current will be cut to, or nearly to, zero. At this time the relay 58 in the plate circuit will be actuated to cause the green light to be illuminated and also cause the bell alarm 62 to be sounded provided the latter is cut into the local circuit with the green light at the switch 64. At the same time that the electric circuit is closed through the water between the electrodes 20 and 25, the solenoid valve 9 is closed to shut off the discharge of oil from the tank 1 and make it impossible for water to follow the oil to the burner.

The operation of the apparatus as a control device in filling the tank 1 with oil is as follows: First set the switch arms 41 and 45 at the "fill" position in engagement with the contacts 39 and 39' respectively of the switch 38, close the valve 13 in the water supply pipe line 11, and set the gage valve 17 in open position, at which time the operating lever 18 of said valve will be held open by the solenoid release catch 19. Open the valves 6 and 7 in the fuel supply pipe 5. The solenoid valve 9 is closed. As the oil 4 enters the tank 1 through the supply pipe 5, the water 2 will be forced outwardly from said tank through the pipes 11 and 14 and valve 17 to be discharged at any suitable location, as into a sewer, and the level 3 or interface between the oil and water in the tank 1 will finally be forced below the exposed lower extremity of the electrode 21, at which time said lower extremity will be located in oil while the exposed lower extremity of the electrode 20 will still remain in water, thereby breaking the electric circuit therebetween. A zero potential will now be applied to the grid 43 of the vacuum tube 44 and current will flow in the plate circuit with the result that the relay 58 will be actuated to cause the red light 60 to be illuminated and also cause the bell alarm 62 to be sounded provided the latter is cut into the local circuit with said red light at the switch 64. At this time the solenoid release catch 19 is actuated to release the lever 18 of the valve 17 allowing the weight thereon to close said valve. With the water overflow closed off it is impossible for any more oil to enter the tank 1 and also impossible for any of the oil to follow the water to the sewer. Under these conditions, furthermore, the solenoid valve 9 will operate to permit the oil to flow to the burner through the pipe 8 when the valve 13 is again opened and the switch 38 is set for "discharge."

The operation of the apparatus as a gauge in ascertaining the quantity of oil in the tank 1 is as follows: The arms 41 and 45 of the switch 38 are moved from "empty" towards "full", or vice versa, to successively engage the arm 41 with the contacts 33, 34, 35, 36 and 37, and the arm 45 with the contacts 33', 34', 35', 36' and 37' of said switch. At this time the solenoids for the valve 9 and for the catch 19 are automatically disconnected from the electric circuits. As the arms 41 and 45 are moved into contact with the various contacts above mentioned, the green light 61 or the red light 60 will be illuminated as occasioned by the closing or the opening of the various electric circuits between the electrodes 21, 22, 23, 24 and 25, and the electrode 20 which is common to all of the circuits including these electrodes. When the exposed lower extremities of the electrodes above mentioned are in water the circuits will be closed and the green light 61 will be illuminated, but if any one of the extremities of said electrodes 21, 22, 23, 24 or 25 is in oil and the electrode 20 is in water the electric circuits will be open and the red light 60 will be illuminated. The fineness of the reading of the contents of the container by the gauge is determined by the number of electrodes provided in the tank 1, and it is evident that it is increased by increasing the number of said electrodes, in which event the exposed contact portions thereof will be spaced closer together.

One or more vacuum tubes with any suitable power supply well known in the art may be utilized as may be desired, the basic principle being that a change of level of the liquid or liquids to be gauged causes a change of grid bias. This change of grid bias changes the amount of current flowing in the plate circuit of the vacuum tube, and this change of plate current is utilized to operate visible and/or audible signals or alarms, to control the flow of liquid or liquids into or out of a container, or to control the operation of any other desired apparatus.

While it is possible to use a positive grid potential (bias), to do so would mean that there would be a grid current flowing through the tank.

By setting the alarm switch 64 for either oil or water, and setting the swtch 38 at the point alarm is desired, the bell 62 will ring when the water or oil reaches that level in the tank. This may be used as a warning that more oil is needed.

It will be understood that the contact members 33', 34', 35', 36' and 37' of the switch 38 that have no wires connected thereto perform no function in the operation of the device other than to contribute to the smooth operation of the switch arm 45.

I claim:

1. Liquid level responsive means having, in combination, a container for a liquid and at least one other separate hazardous fluid, said fluids having different electrical resistances, a vacuum tube, sources of electrical potential to energize said tube, two electric contacts interposed in the grid circuit of the vacuum tube, at least one positioned at a predetermined level within said container exposed to said fluids, there being a negative potential applied to said grid through the fluid of least electrical resistance when both of said contacts are immersed therein, and means responsive to change in the plate circuit of the vacuum tube.

2. Liquid level responsive means having, in combination, a container for water and a non-mixing hazardous fluid, the latter being a non-conductor of electricity, a vacuum tube, sources of electrical potential to energize said tube, electric contacts interposed in the grid circuit of the vacuum tube and positioned at different levels within said container exposed to said fluids, there being a negative potential applied to said grid through said water when two of said contacts are immersed therein, and means responsive to change in the plate circuit of the vacuum tube.

GORDON E. EWERTZ.